(12) United States Patent
Abali et al.

(10) Patent No.: US 8,060,772 B2
(45) Date of Patent: Nov. 15, 2011

(54) STORAGE REDUNDANT ARRAY OF INDEPENDENT DRIVES

(75) Inventors: Bulent Abali, Tenafly, NJ (US); Mohammad Banikazemi, New York, NY (US); James L. Hafner, San Jose, CA (US); Dan Edward Poff, Mahopac, NY (US); Krishnakumar Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/969,601

(22) Filed: Jan. 4, 2008

(65) Prior Publication Data
US 2009/0177918 A1 Jul. 9, 2009

(51) Int. Cl.
*G06F 11/00* (2006.01)
(52) U.S. Cl. .......................... 714/3; 711/111
(58) Field of Classification Search ............. 714/3
See application file for complete search history.

(56) References Cited

U.S. PATENT DOCUMENTS

| | | | |
|---|---|---|---|
| 5,579,475 A | 11/1996 | Blaum et al. | |
| 5,651,133 A * | 7/1997 | Burkes et al. | 711/114 |
| 5,790,773 A | 8/1998 | DeKoning et al. | |
| 5,930,828 A * | 7/1999 | Jensen et al. | 711/170 |
| RE36,846 E | 8/2000 | Ng et al. | |
| 6,185,368 B1 * | 2/2001 | Iwasaki et al. | 386/125 |
| 6,976,187 B2 * | 12/2005 | Arnott et al. | 714/5 |
| 7,093,157 B2 | 8/2006 | Hajji | |
| 7,143,305 B2 | 11/2006 | Hajji et al. | |
| 7,143,308 B2 | 11/2006 | Tseng et al. | |
| 7,308,599 B2 * | 12/2007 | Patterson | 714/6 |
| 7,418,550 B2 * | 8/2008 | Hetrick et al. | 711/114 |
| 2002/0191311 A1 * | 12/2002 | Ulrich et al. | 360/1 |
| 2003/0088803 A1 * | 5/2003 | Arnott et al. | 714/5 |
| 2004/0250161 A1 * | 12/2004 | Patterson | 714/6 |
| 2005/0166085 A1 | 7/2005 | Thompson et al. | |
| 2005/0262385 A1 | 11/2005 | McNeill, Jr. et al. | |
| 2006/0101205 A1 | 5/2006 | Bruning, III et al. | |
| 2006/0101302 A1 | 5/2006 | Wong | |
| 2006/0218433 A1 | 9/2006 | Williams | |

OTHER PUBLICATIONS

Dholakia et al., "Analysis of a New Intra-Disk Redundancy Scheme for High-Reliability RAID Storage Systems int eh Presence of Unrecoverable Errors", SIGMetrics/Performance '06, Jun. 2006, Saint Malo, France, pp. 373-374.

(Continued)

*Primary Examiner* — Scott Baderman
*Assistant Examiner* — Kamini Patel
(74) *Attorney, Agent, or Firm* — Yee & Associates, P.C.; Stephen C. Kaufman (57) ABSTRACT

A computer implemented method, apparatus, and computer usable program product for managing redundant array of independent drives. In response to a failure of a hard disk in a first RAID array, the process calculates an amount of free capacity available across a set of remaining hard disks in the first RAID array. The set of remaining hard disks comprises every hard disk associated with the first RAID array except the failed disk. In response to a determination that the amount of free capacity is sufficient to re-create the first RAID array at a same RAID level, the process reconstructs the first RAID array using an amount of space in the set of remaining drives utilized by the first RAID array and the free capacity to form a new RAID array without utilizing a spare hard disk.

22 Claims, 7 Drawing Sheets

OTHER PUBLICATIONS

Deo et al., "A Graph Theoretic Algorithm for Placing Data and parity to Tolerate Two Disk Failures in Disk Array Systems", Proceedings of the Ninth International Conference on Information Visualisation (IV'05) 2005, pp. 1-8.

Holland et al., "Architectures and Algorithms for On-Line Failure Recovery in Redundant Disk Arrays", Journal of Distributed and Parallel Databases, Jul. 1994, pp. 1-40.

* cited by examiner

STORAGE REDUNDANT ARRAY OF INDEPENDENT DRIVES

BACKGROUND OF THE INVENTION

1. Field of the Invention

The present invention is related generally to a data processing system and in particular to a method and apparatus for data storage. More particularly, the present invention is directed to a computer implemented method, apparatus, and computer usable program code for reconstructing redundant array of independent drive (RAID) arrays on single storage systems.

2. Description of the Related Art

A storage subsystem is comprised of one or more storage controllers and one or more disk drives. The storage system controllers provide access to attached disk drives and support features, such as caching, copy services, and various levels of reliability.

Redundant array of independent drives (RAID), also referred to as redundant array of independent disks, is a type of data storage system that divides and/or duplicates data among multiple hard drives. In a RAID array, data is stored across multiple disk drives. In addition to user data parity, information is stored on portions of one or more disk drives across the RAID array.

Various RAID levels are used to provide reliability in a wide range of storage systems. For example, in a level one RAID, a single hard drive is used for primary data storage and a second hard drive is used for mirroring and/or copying the data on the first hard drive. In a level five RAID array (RAID5), block-level striping is used with parity data being distributed across all disks of the array. When a disk failure is detected, data blocks stored on the failed disk can be "recovered" by using the corresponding parity block and data blocks in the same stripe. Depending on the RAID level, one or more disk failures can be tolerated without any loss of data.

Furthermore, some storage systems support hot spare disks which can replace failing disk drives. When spare disks are used in a storage subsystem, the hot spare disks are not utilized with respect to capacity and head bandwidth, until a disk drive failure occurs. If the storage system supports hot sparing and a hot spare disk drive is available, the hot spare disk becomes part of the array when any array disk in the RAID array fails. When the RAID disk failure occurs, data from the failed disk drive is reconstructed and stored onto the hot spare disk.

The more spare disks are available, the more disk failures can be tolerated by the storage subsystem, assuming that another failure does not occur while the spare disk is being constructed and added to the RAID array. However, as more hot spare disks are provided to the storage subsystem, less user data can be stored because the hot spare disks are not used until a disk drive failure occurs. Hot spare disks also result in increased costs and decreased efficiency in utilization of available disks.

SUMMARY OF THE INVENTION

The illustrative embodiments provide a computer implemented method, apparatus, and computer usable program product for managing redundant array of independent drives. In one embodiment, in response to a failure of a hard disk associated with an original redundant array of independent drives to form a failed disk, the process calculates an amount of free capacity available across a set of remaining hard disks associated with the original redundant array of independent drives. The set of remaining hard disks comprises every hard disk associated with the original redundant array of independent drives except the failed disk. In response to a determination that an amount of free capacity associated with the set of remaining hard disks is sufficient to re-create the original redundant array of independent drives at a same RAID level as a RAID level of the original redundant array of independent drives, the process reconstructs the original redundant array of independent drives using an amount of space in the set of remaining drives utilized by the original redundant array of independent drives and the free capacity to form a new redundant array of independent drives. The new redundant array of independent drives is generated in an absence of a spare hard disk.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
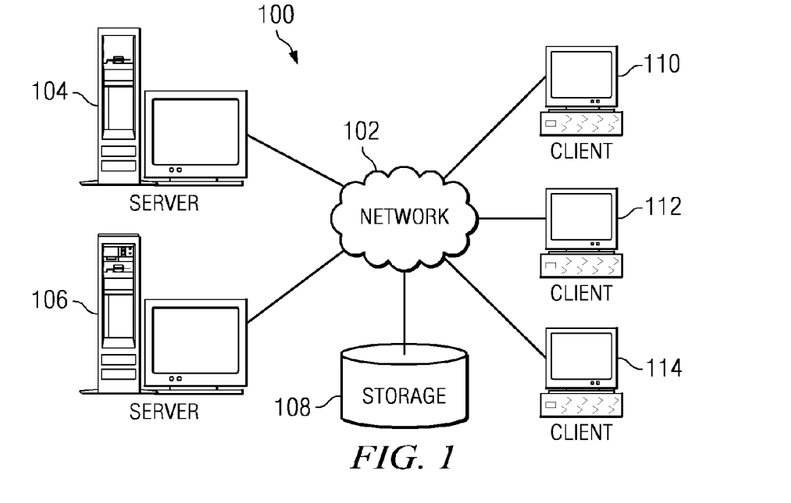
FIG. 1 is a pictorial representation of a network of data processing systems in which illustrative embodiments may be implemented.
Figure 2:
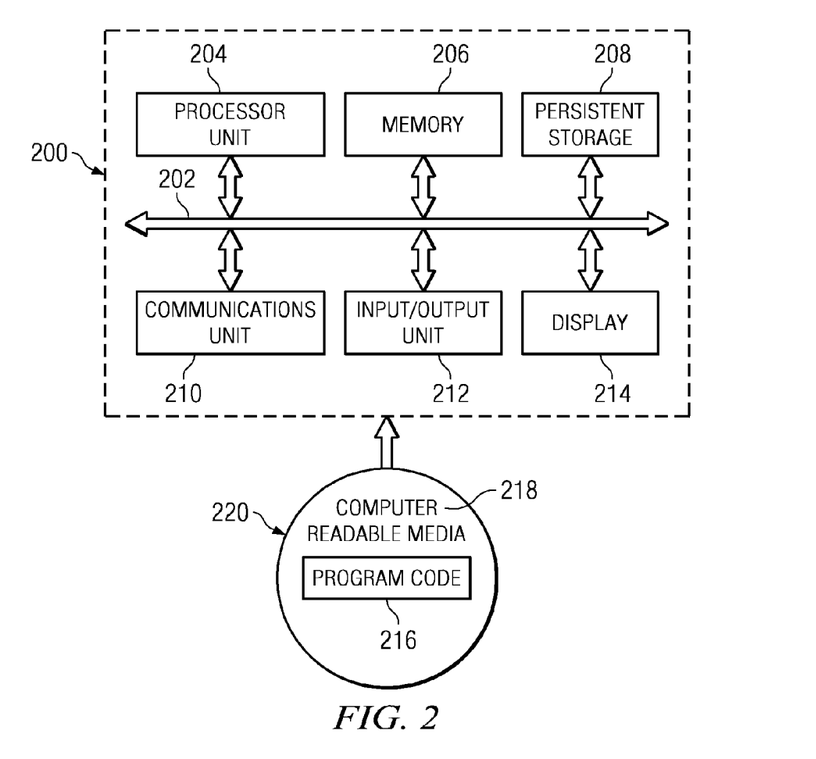
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables. Network 102 may also contain a separate network for connecting servers and clients to storage systems. For example, network 102 may include, without limitation, Fibre Channel or InfiniBand for connecting servers 104-106 and clients 110-114 with storage 108.

In the depicted example, server 104 and server 106 connect to network 102 along with storage unit 108. Storage unit 108 is a storage unit associated with one or more redundant array of independent drives (RAID) arrays. In other words, storage 108 includes one or more RAID arrays. The RAID arrays may include any number of hard disks. In addition, the RAID arrays may be RAID arrays at any RAID level for storing data.

In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media x18 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

RAID arrays use multiple hard disks to divide and/or replicate data among the multiple hard drives to provide increased data reliability and/or increased performance. There are multiple different RAID levels. At RAID level one, everything on one hard disk is copied onto a second hard disk. This is referred to as mirroring. If any one disk is lost, the data is still available on the second disk. However, at RAID level one, the user loses half of the hard disk storage capacity.

RAID level five is the most popular RAID level. At RAID level five, one disk worth of data is used for parity and is distributed among the RAID disks. The remainder of the disk capacity that is not used for parity is used for storing user data. For example, if a RAID array has five disks, and the user wants to store 100 gigabytes of data, the RAID array stores 100 gigabytes of user data plus 25 gigabytes of parity on five disks. That is 25 gigabytes of parity data per disk. At any given time, if one of the five disks fails, the user does not lose data. In addition, the amount of disk space for parity or redundancy at RAID level five is less because only a single hard disk capacity is used for parity.

However, if a RAID array has seven disks and one disk fails, the user has not lost any data, but the user will lose data if a second disk in the RAID array fails. The user can use a hot spare disk to minimize this problem. A hot spare is a failover disk that is not used to store data. In other words, the hot spare disk is not part of the RAID array although the hot spare disk is active and connected to the storage system. When a disk in the RAID array fails, the hot spare disk is switched into operation. Data from the RAID array is then copied onto the hot spare disk, which acts as a replacement for the failed RAID member disk and is now part of the RAID array.

As more hot spare disks are provided to a storage subsystem, less user data can be stored because the hot spare disks are not used until a disk drive failure occurs. On the other hand, when more spare disks are available, more disk failures can be tolerated by the storage subsystem, assuming that another failure does not occur while the spare disk is being constructed and added to the RAID array.

Thus, the utilization of hot spare drives can increase costs and expenses of maintaining reliability and fault tolerance in a RAID array. Moreover, the number of RAID disks available for current data storage is reduced by the number of hot spare disks that cannot be made available for data storage until a disk failure in a RAID array disk occurs. In other words, if a user has seven disks, rather than having a seven disk RAID array, the user implementing the current hot spare disk methods will be limited to a five or six disk RAID array to maintain one or two hot spare disks. However, the user will still be burdened with the costs of acquiring seven hard disks. Thus, the current solutions are both inefficient and expensive for users.

The illustrative embodiments recognize that utilization of hot spare disks is inefficient use of the hard disks available to a user. In other words, if a user purchases eight disks and designates one disk as a hot spare disk, the RAID array constructing using the remaining disks will only be a seven disk member RAID array even though the user has eight hard disks. The illustrative embodiments recognize that a need exists for providing enhanced reliability and tolerance for disk failures in a RAID storage system without using hot spare drives to decrease the costs and increase the benefits of utilizing multiple hard disks in a RAID array. Therefore, the illustrative embodiments provide a computer implemented method, apparatus, and computer usable program product for managing redundant array of independent drives.

In one embodiment, when a failure of a hard disk associated with an original redundant array of independent drives occurs, the process calculates an amount of free capacity available across a set of remaining hard disks associated with the original redundant array of independent drives. The hard disk that suffered the failure is referred to herein as a failed disk. The set of remaining hard disks is a set of two or more hard disks associated with the original redundant array of independent drives except the failed disk.

Free capacity is an amount of space on each disk in the set of remaining disks that is not currently being used to store data. In other words, free capacity is an amount of space that is not being used for user data, parity data, or any other data stored on the RAID array. In response to a determination that the amount of free capacity is sufficient to re-create the original redundant array of independent drives at a same RAID level as a RAID level of the original redundant array of independent drives using only the set of remaining hard disks, the process reconstructs the original redundant array of independent drives using an amount of space in the set of remaining drives utilized by the original redundant array of independent drives and the free capacity to form a new redundant array of independent drives.

The new redundant array of independent drives is generated without using a spare disk. In other words, the given RAID array is reconstructed using the space in the set of remaining disks that was utilized by the given RAID array and the free capacity in an absence of a spare hard disk.

Figure 3:
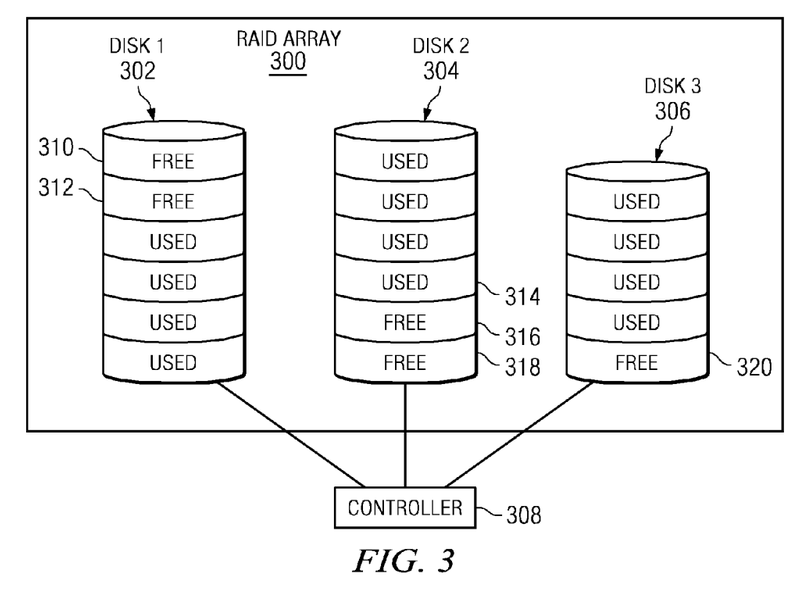
FIG. 3 is a block diagram of a storage system having a RAID array in accordance with an illustrative embodiment.

FIG. 3 is a block diagram of a storage system having a RAID array in accordance with an illustrative embodiment. RAID array 300 is a redundant array of independent drives (RAID) consisting of two or more hard disks. RAID array 300 may be implemented in any type of known or available RAID array having any number of RAID member disks. In this example, RAID array 300 consists of disk 1 302, disk 2 304, and disk 3 306. Disk 1 302, disk 2 304, and disk 3 306 are referred to as member disks or RAID member disks. RAID array 300 is a level 5 RAID array. However, RAID array 300 may be implemented as a RAID array of any RAID level, including, without limitation, RAID level 0, level 1, level 2, level 3, level 4, or level 5 given that the correct number of disks are used. For example RAID 1 requires an even number of disks.

Controller 308 is a RAID controller for controlling the storage and parity of data in RAID array 300. Controller 308 reserves a portion of member disks capacity as spare capacity. The free capacity on each disk can be calculated as $((N-1)*d)/(N-2)$ where d is the used capacity on each disk for the array being reconstructed and N is the total number of disks before 1 disk fails.

The spare capacity on each disk is made of one single contiguous segment either starting from the first block or ending in the last disk block for all disks. For example, disk 1 302 has contiguous spare capacity at the beginning of the disk comprising free blocks 310 and 312. Disk 2 304 has contiguous free capacity at the end of the disk comprising free blocks 314-318. Disk 3 306 has a single free block 320 at the end of the disk.

Thus, the disks shown in FIG. 3 are not ready for reconstruction because the free space is at the beginning of disk 2 and 3 but at the end of disk 1. After de-fragmentation and before reconstruction of the RAID array is started, the contiguous free area of all disks is located at either the beginning of all the disks or at the end of all the disks (shown in FIG. 4 below).

When a disk drive fails, controller 308 calculates the free capacity. Controller 308 determines if there is enough free capacity to create a new RAID array with the same RAID level over N−1 disks, where "N" is the original number of RAID member disks and "N−1" is the number of RAID member disks after one disk fails. The new array is recreated across the N−1 disks using the contiguous free capacity located at the beginning or the end of each disk.

In one embodiment, if the free capacity is not located at the beginning or the end of each disk, controller 308 de-fragments the array such that all the free capacity, also referred to as free blocks or unallocated regions, of the RAID member disks are moved to the end of each member disk or the beginning of each member disk. This process is performed by any known or available method for de-fragmenting a disk, such as, without limitation, moving stripes up or down on member disks.

Controller 308 reconstructs the RAID array with the new number of N−1 disks from the end when the free capacity is at the end of all member disks or from the beginning of each disk when the free capacity is located at the beginning of all member disks. During this process, controller 308 calculates where the last stripe of the new array is located. Then, controller 308 generates that stripe across member disks with appropriate parity also generated. The same process is continued for previous stripes. If the free capacity is at the beginning of the disk, controller 308 starts from the first stripe and generates that stripe across member disks with appropriate parity. Controller 308 then goes down the stripes, such as to the second and third stripes, to completely rebuild the RAID array, until all the stripes are generated across the RAID array. The reconstruction is performed in such a way that data and metadata integrity is ensured in the face of power failures, controller failures, and disk drive failures.

When performing this step, controller 308 ensures there is sufficient free space for constructing the new array in the absence of a hot spare disk. In other words, in this embodiment, there is no need for a temporary space for copying data out of the RAID array because controller 308 ensures there is sufficient free space within the RAID array to prevent overrun data from the old array as controller 308 constructs the new array. Because there is sufficient free capacity in a contiguous manner, the reconstruction can be performed completely within RAID array 300 using existing RAID array members without the necessity for any additional spare disks or other added storage capacity.

In this example, RAID array 300 includes 3 disks. However, RAID array 300 may include any number of hard disks in accordance with this embodiment. For example, if RAID array 300 includes seven disk drives in a storage controller at a RAID level five, six disks worth of storage is used for user data while only one disk's worth of storage are used for parity information across the seven disks. If the user data can be stored on five disks, the illustrative embodiment in FIG. 3 can be used to create a new RAID level 5 across the six healthy disks after one of the seven disks in the original RAID array fails. In such as case, the RAID array is rebuilt across the six healthy disks without replacing the failed disk, without necessitating maintenance of a spare disk, and without copying data out of the RAID array into any temporary storage during reconstruction of the RAID array and without losing any data stored in the original RAID array.

Figure 4:
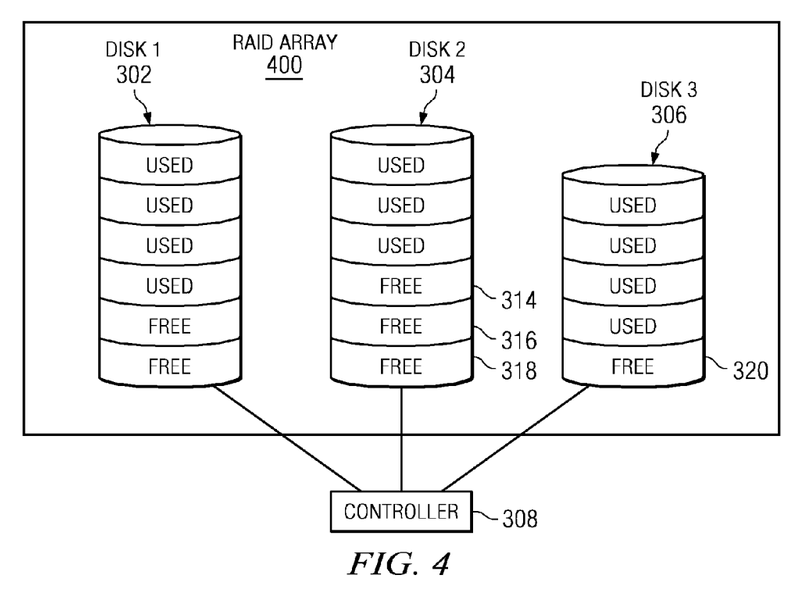
FIG. 4 is a block diagram of a RAID array after de-fragmenting the set of remaining disks in the array to form free capacity in accordance with an illustrative embodiment.

FIG. 4 is a block diagram of a RAID array after de-fragmenting the set of remaining disks in the array to form free capacity in accordance with an illustrative embodiment. In this example, all the free, unallocated space in the set of remaining disks in RAID array 400 is located at the end of disks 302, 304, and 306. After de-fragmentation and before reconstruction of the RAID array is started, the contiguous free area of all disks is located at either the beginning of all the disks or at the end of all the disks. Thus, the disks shown in FIG. 4 are ready for reconstruction because the free space is at the beginning of all the disks.

Figure 5:
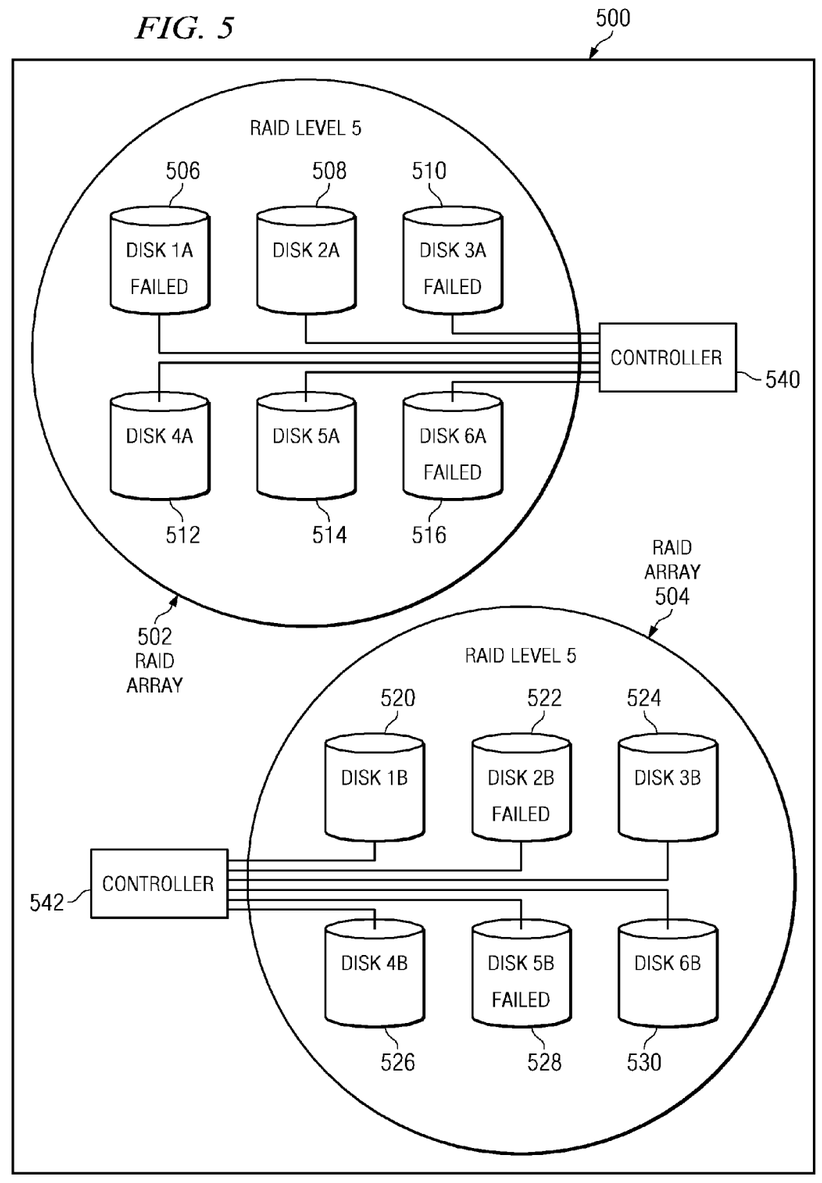
FIG. 5 is a block diagram of a storage system having multiple RAID arrays in accordance with an illustrative embodiment.

Turning now to FIG. 5, a block diagram of a storage system having multiple RAID arrays is shown in accordance with an illustrative embodiment. Storage system 500 is a data storage system associated with a data processing system, such as data processing system 100 in FIG. 1 or data processing system 200 in FIG. 2. Storage system 500 comprises RAID array 502 and RAID array 504.

RAID array 502 is a RAID array having six hard disks 506-516. In this example, disks 1A 506, 3A 510, and 6A 516 have failed. RAID array 504 also includes six disks 520-530. In this example, disk 2B 522 and 5B 528 have failed.

In this example, controller 540 determines that the number of available disks that have not failed in RAID array 502 has fallen below a threshold number of disks. The threshold number of disks may be a pre-defined or default number of disks. The threshold number may also be a user-defined number of disks. Controller 540 identifies RAID array 504 as a RAID array having the same RAID level as RAID array 502. Controller 540 and 542 then combine RAID array 502 and RAID array 504 to form a single, new RAID array having seven functional disks, as shown in FIG. 6 below.

Figure 6:
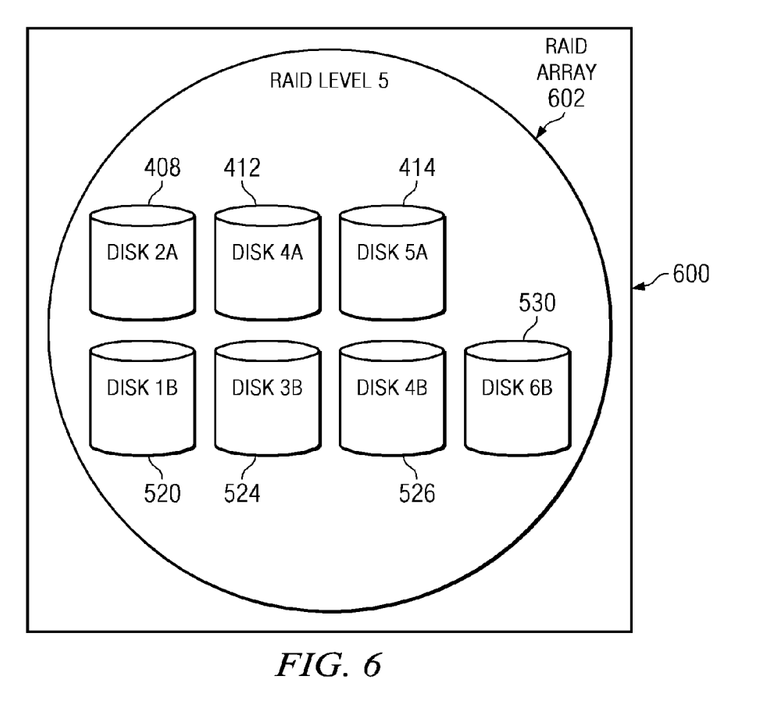
FIG. 6 is a block diagram of a storage system having a new RAID array constructed using RAID disk members from two or more RAID arrays in accordance with an illustrative embodiment.

FIG. 6 is a block diagram of a storage system having a new RAID array constructed using RAID disk members from two or more RAID arrays in accordance with an illustrative embodiment. Storage subsystem 600 includes one or more RAID arrays, such as, without limitation, RAID array 602. RAID array 602 is a single, new RAID array constructed by combining the functional hard disks from RAID array 502 and 504 in FIG. 5. The RAID arrays combined belong to the same storage system 500 and are at the same RAID level. RAID array comprises seven hard disks, disk 2A 408, disk 4A 412, disk 5A 414, disk 1B 520, disk 3B 524, disk 4B 526, and disk 6B 530.

Thus, if the number of functional disk drives in a RAID array goes below a threshold number or an acceptable level, then two or more RAID arrays of the same RAID level and the same storage system are combined together. This reduces the parity overhead. For example, RAID array 502 in FIG. 5 is a level five array that has been reduced from six disks to three disks while RAID array 504 has been reduced to a four disk array. In such as case, the two separate RAID arrays require two disks worth of storage capacity (%29) for parity data. When these two arrays are combined to form RAID array 602 in FIG. 6, only a single disk worth of storage capacity out of seven hard disks is require for parity data. This reduces the overhead for parity data from 29% to only 14%.

In another embodiment, where there is not enough free capacity to create a new RAID array using the remaining RAID member disks, an amount of data necessary to free up sufficient capacity is moved to another RAID array such that there is enough space for rebuilding the new array using the remaining RAID member disks. For example, a sufficient number of logical volumes can be moved to a different RAID array in the storage system to permit rebuilding of the new array without requiring a hot spare disk and without combining the RAID array with another RAID array.

In another embodiment, LUNs may be moved to a RAID array in a different storage system, rather than only moving LUNs to RAID arrays associated with the same storage system. This case requires a transfer controller entity (not shown). The transfer controller entity is a software component that coordinates the move from of data from one RAID array to another RAID array and provides the necessary configuration changes for the data transfer.

Figure 7:
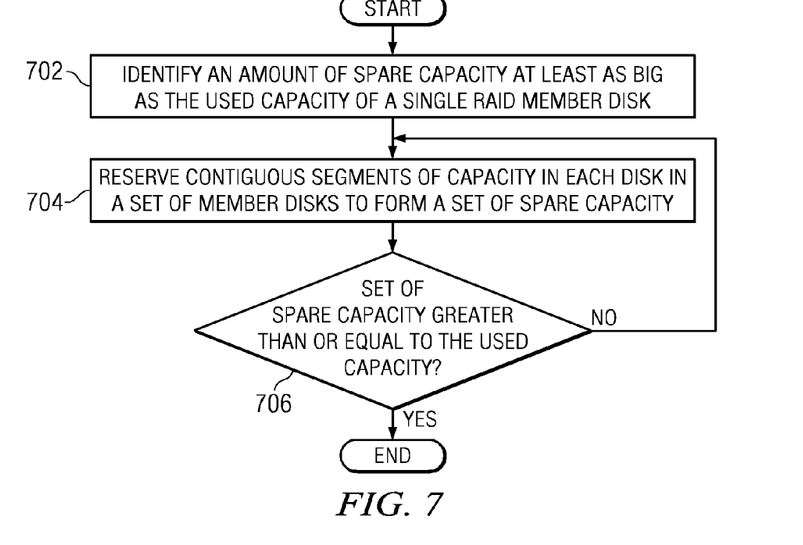
FIG. 7 is a flowchart illustrating a process for reserving spare capacity across RAID disk members in accordance with an illustrative embodiment.

Referring now to FIG. 7, a flowchart illustrating a process for reserving spare capacity across RAID disk members is shown in accordance with an illustrative embodiment. The process in FIG. 7 is implemented by a RAID controller, such as controller 308 in FIG. 3 or controllers 540 or 542 in FIG. 5.

The process begins by identifying an amount of spare capacity at least as big as the used capacity of a single RAID member disk (step 702). Spare capacity is also referred to as free capacity. The process reserves a single contiguous segment of spare capacity in each disk in a set of member disks to form a set of spare capacity (step 704). The set of member disks is a set of two or more disks. The set may include all of the disks in the RAID array or only a subset of the member disks in the RAID array.

The process makes a determination as to whether the set of spare capacity is greater than or equal to the used capacity of at least one RAID member disk (step 706). If the set of spare capacity is greater than or equal to the used capacity, the process terminates thereafter. If the spare capacity is less than the used capacity, the process returns to step 704 and continues reserving contiguous segments of capacity in the member disks until sufficient capacity is available with the process terminating thereafter.

Figure 8:
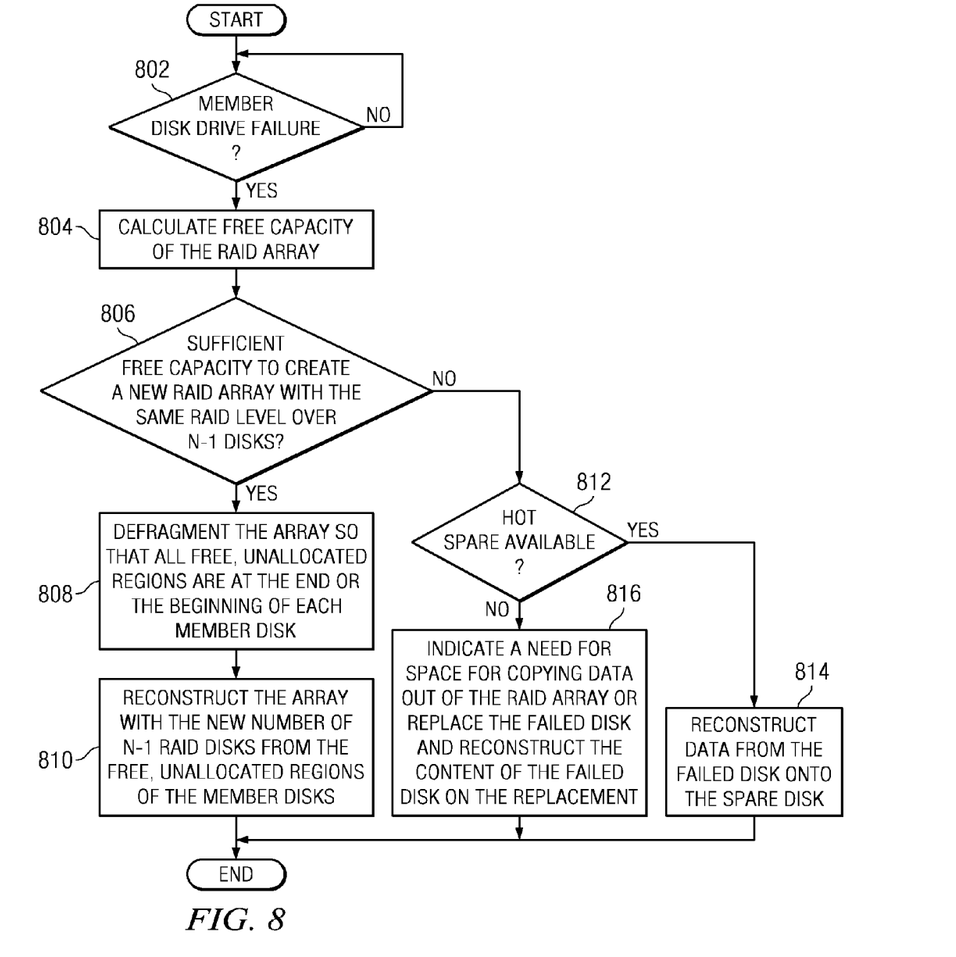
FIG. 8 is a flowchart illustrating a process for reconstructing a RAID array after a disk failure in an absence of a spare disk in accordance with an illustrative embodiment.

FIG. 8 is a flowchart illustrating a process for reconstructing a RAID array after a disk failure in an absence of a spare disk in accordance with an illustrative embodiment. The process in FIG. 8 is implemented by a RAID controller, such as controller 308 in FIG. 3.

The process begins by making a determination as to whether a RAID member disk failure has occurred (step 802). If a failure has not occurred, the process returns to step 802. When a failure does occur, the process calculates the free capacity of the RAID array (step 804). The process then makes a determination as to whether sufficient free capacity is available to create a new RAID array with the same RAID level over the N−1 RAID member disks (step 806). In other words, the process determines if a new RAID can be created using the remaining RAID member disks in the absence of a hot spare disk and in the absence of any other temporary storage outside the RAID array.

If sufficient free capacity is available, the process de-fragments the array so that all free, unallocated regions are located at the end of each member disk or at the beginning of each member disk (step 808). The process reconstructs the RAID array with the new number of N−1 remaining RAID member disks from the free, unallocated regions of the RAID member disks (step 810) with the process terminating thereafter.

Returning to step 806, if sufficient free space is not available, the process determines if a hot spare disk is available (step 812). If a spare disk is available, the process reconstructs the data from failed disk onto the spare disk (step 814) with the process terminating thereafter.

If a spare disk is not available at step 812, the process indicates a need for space for copying data out of the RAID array or the process indicates a need for replacing the failed disk and reconstructing the content of failed disk on the replacement (step 816) with the process terminating thereafter. In other words, the process notifies a user that a spare disk or a replacement disk is needed before the RAID array can be reconstructed.

Figures 9, 10:
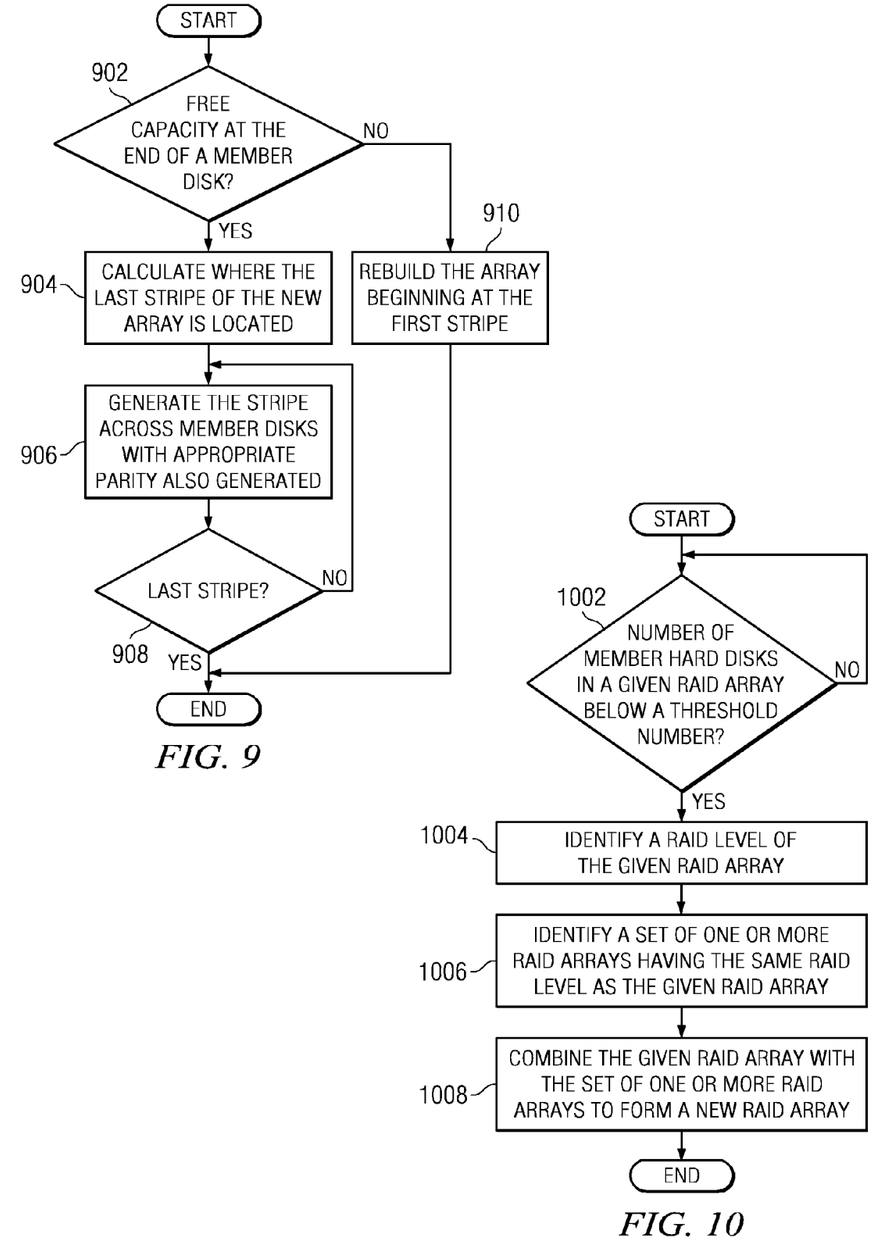
FIG. 9 is a flowchart illustrating a process for rebuilding a new RAID array using free capacity in the RAID array member in accordance with an illustrative embodiment.
FIG. 10 is a flowchart illustrating a process for combining two or more RAID arrays to form a single RAID array in accordance with an illustrative embodiment.

FIG. 9 is a flowchart illustrating a process for rebuilding a new RAID array using free capacity in the RAID array member in accordance with an illustrative embodiment. The process in FIG. 9 is implemented by a RAID controller, such as controller 308 in FIG. 3 or controllers 440 or 442 in FIG. 4. FIG. 9 is a more detailed example of step 810 in FIG. 8.

The process begins by making a determination as to whether free capacity is available at the end of a RAID member disk (step 902). If free capacity is at the end of the disk, the process calculates where the last stripe of the new array is located (step 904). The process generates the stripes across RAID member disks with appropriate parity (step 906). The process determines if the last stripe has been generated (step 908). In other words, the process determines if all the process is done generating all the data. If the process is not finished generating the stripes for all the data, the process returns to step 906 and continues repeatedly generating stripes across RAID member disks. When the process is done generating stripes for all the data, the process terminates thereafter.

Returning to step 902, if the free capacity is located at the beginning of the disk instead of at the end, the process rebuilds the array beginning at the first stripe (step 910) with the process terminating thereafter. In other words, after the first stripe is generated, the process rebuilds the second stripe and then the third stripe in succession until the RAID array is reconstructed.

Turning now to FIG. 10, a flowchart illustrating a process for combining two or more RAID arrays to form a single RAID array is shown in accordance with an illustrative embodiment. The process in FIG. 10 is implemented by a RAID controller, such as controller 308 in FIG. 3 or controllers 440 or 442 in FIG. 4.

The process makes a determination as to whether a number of member hard disks in a given RAID array is below a threshold number (step 1002). If the number is not below the threshold, the process returns to step 1002. When the number of member disks falls below the threshold, the process identifies a given RAID level of the given RAID array (step 1004). The process identifies a set of one or more other RAID arrays associated with the storage system having the same RAID level as the given RAID array (step 1006). The process then combines the given RAID array with the set of one or more other RAID arrays to form a single, new RAID array (step 1008) with the process terminating thereafter.

Each other RAID array is a different RAID array than the given RAID array. In one embodiment, the set of one or more other RAID arrays are RAID arrays having a number of disks that is below the threshold number. When the given RAID array is combined with the set of one or more other RAID arrays, the single new RAID array has a number of disks that is equal to or greater than the threshold number of disks.

In another embodiment, the one or more other RAID arrays includes one or more RAID arrays having a number of un-failed disks that is equal to or greater than the threshold number of disks.

Figure 11:
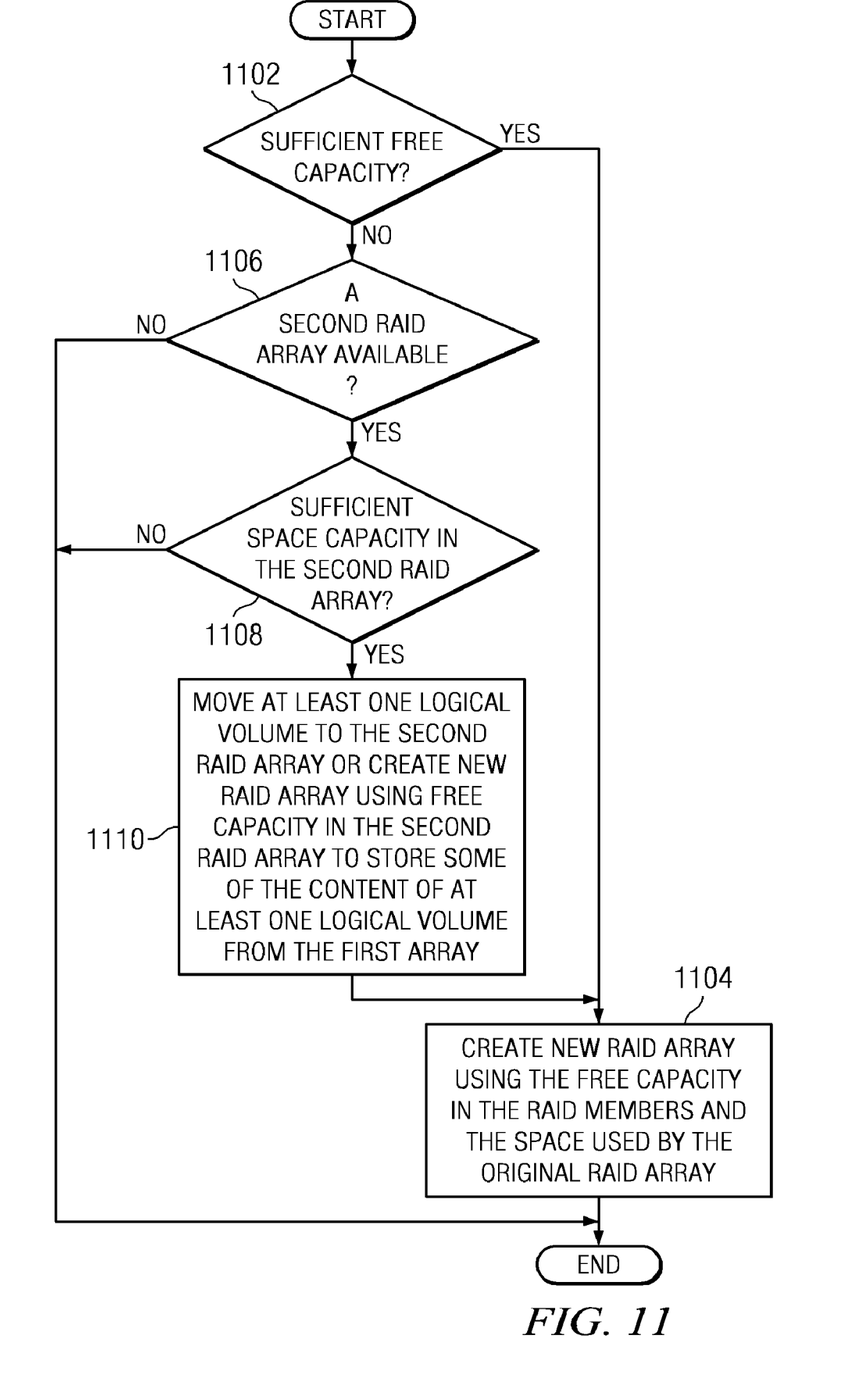
FIG. 11 is a flowchart illustrating a process for utilizing spare capacity in a second RAID array to recreate a first RAID array after a RAID member disk failure in accordance with an illustrative embodiment.

FIG. 11 is a flowchart illustrating a process for utilizing spare capacity in a second RAID array to recreate a first RAID array after a RAID member disk failure in accordance with an illustrative embodiment. The process in FIG. 11 is implemented by a RAID controller, such as controller 308 in FIG. 3 or controllers 440 or 442 in FIG. 4.

The process begins by making a determination as to whether sufficient free capacity is available (step 1102) to reconstruct a RAID array after a RAID member disk failure. If sufficient space is available, the process creates a new RAID array using the space used by the original RAID array and the free capacity in the un-failed RAID members without using a spare disk (step 1104) with the process terminating thereafter. An un-failed RAID member is a disk in the RAID array that has not failed. An un-failed RAID member is a disk in the set of remaining disks.

Returning to step 1102, if sufficient free space is not available, the process makes a determination as to whether a second RAID array is available (step 1106). A second RAID array is available if a second RAID array is present and/or accessible. The second RAID array may be a RAID array in the same storage system or a RAID array in a different storage system. If a second RAID array is not available, the process terminates thereafter.

If a second RAID array is available, the process determines if sufficient capacity is available in the second RAID array to permit the RAID array to hold one or more logical volumes from the first RAID array's data while the first RAID array is being reconstructed to hold the rest of the content of the first RAID array (step 1108). If sufficient capacity is not available, the process terminates thereafter.

If sufficient space is available at step 1108, the process moves some logical volumes to the second array or creates a new RAID array using the free capacity in the RAID members of the second RAID array to store the content of some of logical volumes from the first array (step 1110) and then reconstruct the original RAID array in place using the free capacity and space used by the original RAID array (step 1104) with the process terminating thereafter.

Essentially, in this embodiment, if the process cannot reconstruct the first array such that it can hold all the content that was held in the original RAID array, the process moves one or more logical volumes (LRUs) into another different array and then reconstructs the original RAID array. The reconstructed original array has a smaller capacity so it will not be able to hold all the volumes. Thus, the move of one or more logical volumes to the second RAID array is permanent.

The illustrative embodiments provide a computer implemented method, apparatus, and computer usable program product for managing redundant array of independent drives. In one embodiment, the process calculates an amount of free capacity available across a set of remaining hard disks associated with the original redundant array of independent drives in response to a failure of a hard disk associated with an original redundant array of independent drives to form a failed disk. The set of remaining hard disks comprises every hard disk associated with the original redundant array of independent drives except the failed disk.

In response to a determination that the amount of free capacity is sufficient to re-create the original redundant array of independent drives at a same RAID level as a RAID level of the original redundant array of independent drives using only the set of remaining hard disks, the process reconstructs the original redundant array of independent drives using an amount of space in the set of remaining drives utilized by the original redundant array of independent drives and the free capacity to form a new redundant array of independent drives. The new redundant array of independent drives is generated without using a spare disk. In other words, the given RAID array is reconstructed using the space in the set of remaining disks that was utilized by the given RAID array and the free capacity in an absence of a spare hard disk.

The illustrative embodiments are described as a storage system that does not utilize hot spare disks. However, the illustrative embodiments may also be used in a storage system that utilizes spare disk drives for enhanced reliability without departing from the scope of the embodiments.

The depicted embodiments rebuild RAID arrays in place with different numbers of RAID disk members by using spare capacity on a subset of disks in the RAID array to construct a new RAID array of the same RAID level. The embodiments also construct a new RAID array of the same RAID level using disk members from two or more existing RAID arrays in a storage system.

In this manner, a user can use spare storage capacity across the RAID member hard disks instead of having a dedicated spare hard disk. Thus, the user can reap the benefits of all the available hard disks to construct a RAID array rather than reserving an unused hard disk for a spare hard disk that is only used in the event of a RAID member disk failure.

The illustrative embodiments can be implemented by a single storage system to create a new RAID array and move data from an old RAID array to the new RAID array without using other storage systems or spare disks to temporarily store data from the old RAID array. The embodiments use unused capacity within the existing RAID array members to create the new RAID array. This is more efficient, cheaper, and cost effective than existing solutions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing redundant arrays of independent drives, the computer implemented method comprising:
    responsive to a failure of a hard disk associated with an original redundant array of independent drives to form a failed disk, calculating an amount of free capacity available across a set of remaining hard disks associated with the original redundant array of independent drives, wherein the set of remaining hard disks comprises every hard disk associated with the original redundant array of independent drives except the failed disk;
    responsive to a determination that the amount of free capacity is sufficient to re-create the original redundant array of independent drives at a same redundant array of independent drives level as the original redundant array of independent drives using only the set of remaining hard disks, reconstructing the original redundant array of independent drives using an amount of space in the set of remaining drives utilized by the original redundant array of independent drives and the free capacity to form a new redundant array of independent drives, wherein the new redundant array of independent drives has the same redundant array of independent drives level as the original redundant array of independent drives; and
    responsive to a determination that the amount of free capacity is insufficient to re-create the original redundant array of independent drives at the same redundant array of independent drives level as the original redundant array of independent drives using only the set of remaining hard disks:
        identifying a second redundant array of independent drives having an amount of free capacity that is sufficient to store a set of logical volumes of data associated with the original redundant array of independent drives;
        storing the set of logical volumes of data associated with the original redundant array of independent drives in the second redundant array of independent drives; and
        reconstructing the original redundant array of independent drives using only the set of remaining hard disks used by the original redundant array of independent drives, wherein the reconstructed redundant array of independent drives has the same redundant array of independent drives level as the original redundant array of independent drives.

2. The computer implemented method of claim 1 further comprising:
    de-fragmenting disks in the set of remaining hard disks to generate contiguous, unallocated regions in the disks to form the free capacity.

3. The computer implemented method of claim 2 wherein the contiguous, unallocated regions in the disks are located at an end of each disk or at a beginning of each disk.

4. The computer implemented method of claim 1 further comprising:
    identifying the amount of free capacity that is sufficient to reconstruct the original redundant array of independent drives array with the set of remaining disks; and
    reserving a set of contiguous, unallocated regions in the set of remaining hard disks to form the free capacity, wherein the free capacity is used in addition to the amount of space in the set of remaining drives utilized by the original redundant array of independent drives to reconstruct the original redundant array of independent drives when a hard disk in the set of remaining hard disks fails.

5. The computer implemented method of claim 1 further comprising:
    responsive to a determination that a number of disks in the set of remaining disks is less than a threshold number of disks, identifying a set of additional redundant arrays of independent drives, wherein the set of additional redundant arrays of independent drives has a same redundant array of independent drives level as the original redundant array of independent drives; and
    combining the set of remaining disks in the original redundant array of independent drives with a set of remaining disks in the set of additional redundant arrays of independent drives to form the new redundant array of independent drives, wherein the new redundant array of independent drives has a same redundant array of independent drives level as the redundant array of independent drives level of the original redundant array of independent drives.

6. The computer implemented method of claim 5 wherein the set of additional redundant array of independent drives comprises a single redundant array of independent drives.

7. The computer implemented method of claim 5 wherein the set of additional redundant array of independent drives comprises at least two redundant arrays of independent drives.

8. A computer implemented method for managing redundant array of independent drives, the computer implemented method comprising:
    detecting a failure in a disk associated with an original redundant array of independent drives to form a failed disk, wherein the original redundant array of independent drives comprises a set of remaining hard disks, wherein the set of remaining hard disks comprises every hard disk associated with the original redundant array of independent drives except the failed disk;
    responsive to a determination that a number of disks in the set of remaining disks is less than a threshold number of disks, identifying a set of additional redundant array of independent drives having a same redundant array of independent drives level as the original redundant array of independent drives; and
    combining the original redundant array of independent drives with the set of additional redundant array of independent drives to form a new redundant array of independent drives, wherein the new redundant array of independent drives has the same redundant array of independent drives level as the original redundant array of independent drives.

9. The computer implemented method of claim 8 wherein the set of additional redundant array of independent drives comprises a single redundant array of independent drives.

10. The computer implemented method of claim 8 wherein the set of additional redundant array of independent drives comprises at least two redundant arrays of independent drives.

11. A computer program product for managing redundant array of independent drives, the computer program product comprising:
a computer readable storage medium;
program code stored on the computer readable storage medium for detecting to a failure of a hard disk associated with an original redundant array of independent drives to form a failed disk;
program code stored on the computer readable storage medium for calculating an amount of free capacity available across a set of remaining hard disks associated with the original redundant array of independent drives, wherein the set of remaining hard disks comprises every hard disk associated with the original redundant array of independent drives except the failed disk;
program code stored on the computer readable storage medium for reconstructing the original redundant array of independent drives using an amount of space in the set of remaining drives utilized by the original redundant array of independent drives and the free capacity to form a new redundant array of independent drives, wherein the new redundant array of independent drives has a same redundant array of independent drives level as the original redundant array of independent drives, in response to a determination that the amount of free capacity is sufficient to re-create the original redundant array of independent drives at the same redundant array of independent drives level as the original redundant array of independent drives using only the set of remaining hard disks; and
program code stored on the computer readable storage medium for, responsive to a determination that the amount of free capacity is insufficient to re-create the original redundant array of independent drives at the same redundant array of independent drives level as the original redundant array of independent drives using only the set of remaining hard disks:
identifying a second redundant array of independent drives having an amount of free capacity that is sufficient to store a set of logical volumes of data associated with the original redundant array of independent drives;
storing the set of logical volumes of data associated with the original redundant array of independent drives in the second redundant array of independent drives; and
reconstructing the original redundant array of independent drives using only the set of remaining hard disks used by the original redundant array of independent drives, wherein the reconstructed redundant array of independent drives has the same redundant array of independent drives level as the original redundant array of independent drives.

12. The computer program product of claim 11 further comprising:
program code stored on the computer readable storage medium for de-fragmenting disks in the set of remaining hard disks to generate contiguous, unallocated regions in the disks to form the free capacity.

13. The computer program product of claim 12 wherein the contiguous, unallocated regions in the disks are located at an end of each disk or at a beginning of each disk.

14. The computer program product of claim 11 further comprising:
program code stored on the computer readable storage medium for identifying the amount of free capacity that is sufficient to reconstruct the original redundant array of independent drives array using the set of remaining disks; and
program code stored on the computer readable storage medium for reserving a set of contiguous, unallocated regions in the set of remaining hard disks to form the free capacity, wherein the free capacity is used in addition to the amount of space in the set of remaining drives utilized by the original redundant array of independent drives to reconstruct the original redundant array of independent drives when a hard disk in the set of remaining hard disks fails.

15. The computer program product of claim 11 further comprising:
program code stored on the computer readable storage medium for identifying a set of additional redundant arrays of independent drives in response to a determination that a number of disks in the set of remaining disks is less than a threshold number of disks, wherein the set of additional redundant arrays of independent drives has a same redundant array of independent drives level as the original redundant array of independent drives; and
program code stored on the computer readable storage medium for combining the set of remaining disks in the original redundant array of independent drives with a set of remaining disks in the set of additional redundant arrays of independent drives to form the new redundant array of independent drives, wherein the new redundant array of independent drives has a same redundant array of independent drives level as the redundant array of independent drives level of the original redundant array of independent drives.

16. An apparatus comprising:
a bus system;
a communications system coupled to the bus system;
a memory connected to the bus system, wherein the memory includes computer usable program code; and
a processor unit coupled to the bus system, wherein the processing unit executes the computer usable program code to:
detect a failure of a hard disk associated with an original redundant array of independent drives to form a failed disk;
calculate an amount of free capacity available across a set of remaining hard disks associated with the original redundant array of independent drives, wherein the set of remaining hard disks comprises every hard disk associated with the original redundant array of independent drives except the failed disk; and
in response to a determination that the amount of free capacity is sufficient to re-create the original redundant array of independent drives at a same redundant array of independent drives level as the original redundant array of independent drives using only the set of remaining hard disks, reconstruct the original redundant array of independent drives using an amount of space in the set of remaining drives utilized by the original redundant array of independent drives and the free capacity to form a new redundant array of independent drives, wherein the new redundant array of independent drives has a same redundant array of independent drives level as the original redundant array of independent drives; and in response to a determination that the amount of free capacity is insufficient to re-create the original redundant array of independent drives at the same redundant array of independent drives level as the original redundant array of independent drives using only the set of remaining hard disks:
identify a second redundant array of independent drives having an amount of free capacity that is sufficient to store a set of logical volumes of data associated with the original redundant array of independent drives;
store the set of logical volumes of data associated with the original redundant array of independent drives in the second redundant array of independent drives; and
reconstruct the original redundant array of independent drives using only the set of remaining hard disks used by the original redundant array of independent drives, wherein the reconstructed redundant array of independent drives has the same redundant array of independent drives level as the original redundant array of independent drives.

17. The apparatus of claim 16 wherein the processor unit further executes the computer usable program code to defragment the disks in the set of remaining hard disks to generate contiguous, unallocated regions in the disks to form the free capacity.

18. The apparatus of claim 17 wherein the contiguous, unallocated regions in the disks are located at an end of each disk or at a beginning of each disk.

19. The apparatus of claim 16 wherein the processor unit further executes the computer usable program code to identify the amount of free capacity that is sufficient for reconstructing the original redundant array of independent drives array with the set of remaining disks; and reserve a set of contiguous, unallocated regions in the set of remaining hard disks to form the free capacity, wherein the free capacity is used in addition to the amount of space in the set of remaining drives utilized by the original redundant array of independent drives to reconstruct the original redundant array of independent drives when a hard disk in the set of remaining hard disks fails.

20. The apparatus of claim 16 wherein the processor unit further executes the computer usable program code to identify a set of additional redundant arrays of independent drives in response to a determination that a number of disks in the set of remaining disks is less than a threshold number of disks, wherein the set of additional redundant arrays of independent drives has a same redundant array of independent drives level as the original redundant array of independent drives; and combine the set of remaining disks in the original redundant array of independent drives with a set of remaining disks in the set of additional redundant arrays of independent drives to form the new redundant array of independent drives, wherein the new redundant array of independent drives has a same redundant array of independent drives level as the redundant array of independent drives level of the original redundant array of independent drives.

21. A storage subsystem for a computing device, the storage subsystem comprising:
a set of hard disks, wherein the set of hard disks comprises a failed disk and a set of remaining disks, wherein the set of remaining hard disks comprises every hard disk associated with an original redundant array of independent drives except the failed disk;
a redundant array of independent drives controller, wherein the redundant array of independent drives controller calculates an amount of free capacity available across the set of remaining hard disks in response to a failure of the failed hard disk;
responsive to a determination that the amount of free capacity is sufficient to re-create the original redundant array of independent drives at a same redundant array of independent drives level as the original redundant array of independent drives using only the set of remaining hard disks, reconstruct the original redundant array of independent drives using the free capacity and an amount of space in the set of remaining drives utilized by the original redundant array of independent drives to form a new redundant array of independent drives, wherein the new redundant array of independent drives has the same redundant array of independent drives level as the original redundant array of independent drives; and
responsive to a determination that the amount of free capacity is insufficient to re-create the original redundant array of independent drives at the same redundant array of independent drives level as the original redundant array of independent drives using only the set of remaining hard disks:
identify a second redundant array of independent drives having an amount of free capacity that is sufficient to store a set of logical volumes of data associated with the original redundant array of independent drives;
store the set of logical volumes of data associated with the original redundant array of independent drives in the second redundant array of independent drives; and
reconstruct the original redundant array of independent drives using only the set of remaining hard disks used by the original redundant array of independent drives, wherein the reconstructed redundant array of independent drives has the same redundant array of independent drives level as the original redundant array of independent drives.

22. The storage subsystem of claim 21 further comprising:
a second redundant array of independent drives having a same redundant array of independent drives level as the new redundant array of independent drives, wherein the redundant array of independent drives controller combines the new redundant array of independent drives with the second redundant array of independent drives to form a third redundant array of independent drives in response to a determination that a number of disks in the set of remaining disks associated with the new redundant array of independent drives is less than a threshold number of disks, and wherein the third redundant array of independent drives has a same redundant array of independent drives level as the redundant array of independent drives level of the original redundant array of independent drives.

* * * * *